United States Patent
Abrams et al.

(10) Patent No.: US 9,720,750 B1
(45) Date of Patent: Aug. 1, 2017

(54) INVOKING A RESTRICTED ACCESS SERVICE THROUGH A RESTFUL INTERFACE

(71) Applicant: INTERNATIONAL BUSINESS MACHINES CORPORATION, Armonk, NY (US)

(72) Inventors: Robert M. Abrams, Wappingers Falls, NY (US); Victor G. Alonzo, Wappingers Falls, NY (US); Gisela C. Cheng, Rhinebeck, NY (US); Kin Ng, Wappingers Falls, NY (US); Vaughn C. Page, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/274,032

(22) Filed: Sep. 23, 2016

(51) Int. Cl.
*G06F 13/00* (2006.01)
*G06F 9/54* (2006.01)
*H04L 29/06* (2006.01)

(52) U.S. Cl.
CPC ............. *G06F 9/547* (2013.01); *H04L 63/08* (2013.01); *H04L 63/083* (2013.01); *H04L 63/0884* (2013.01); *H04L 63/102* (2013.01)

(58) Field of Classification Search
CPC ....................................... G06F 9/541
USPC ....................................... 719/328
See application file for complete search history.

(56) References Cited

U.S. PATENT DOCUMENTS

| | | | |
|---|---|---|---|
| 9,356,962 B2* | 5/2016 | Ilieva | H04L 63/20 |
| 9,450,944 B1* | 9/2016 | Sousley | H04L 67/02 |
| 2010/0198730 A1 | 8/2010 | Ahmed et al. | |
| 2013/0086639 A1 | 4/2013 | Sondhi et al. | |
| 2013/0086669 A1* | 4/2013 | Sondhi | G06F 21/41 726/8 |
| 2013/0246944 A1* | 9/2013 | Pandiyan | G06F 9/54 715/760 |
| 2015/0193243 A1 | 7/2015 | Varkhedi et al. | |

OTHER PUBLICATIONS

List of IBM patents or Patent Applications Treated as Related; Date Filed: Oct. 6, 2016, p. 1-2.

(Continued)

*Primary Examiner* — Andy Ho
(74) *Attorney, Agent, or Firm* — Cantor Colburn LLP; William A. Kinnaman, Jr.

(57) ABSTRACT

Examples of techniques for invoking a restricted access service through a representational state transfer (RESTful) interface are disclosed. In one example implementation according to aspects of the present disclosure, a method may include: receiving, at a web server, a RESTful application program interface (API) request to access a RESTful API from a user on a mobile device; determining whether the user is authorized to access the RESTful API using an authorization service; responsive to determining that the user is authorized to access the RESTful API, routing the RESTful API request from the web server to the restricted access service to process the request; receiving, by the web server, return data from the restricted access service after processing the request; and invoking a data transformer associated with the RESTful API to transform the return data into transformed data.

20 Claims, 6 Drawing Sheets

(56) References Cited

OTHER PUBLICATIONS

Robert M. Abrams, et al.,"Providing Highly Available and Scalable Access to a Restricted Access Service Through a Restful Interface", U.S. Appl. No. 15/274,059, filed Sep. 23, 2016.
Robert M. Abrams, et al.,"Representational State Transfer Request Routing", U.S. Appl. No. 15/273,994, filed Sep. 23, 2016.
B. Abrams, et al., "Planning the Development of a Z/Os Mobile Application to Access Authorized Services", IBM, white paper, Apr. 28, 2016, p. 1-16.
List of IBM patents or Patent Applications Treated as Related; Date Filed: Oct. 5, 2016, p. 1-2.
Robert M. Abrahms, et al.,"Providing Highly Available and Scalable Access to a Restricted Access Service Through a Restful Interface", U.S. Appl. No. 15/430,855, filed Feb. 13, 2017.

* cited by examiner

INVOKING A RESTRICTED ACCESS SERVICE THROUGH A RESTFUL INTERFACE

BACKGROUND

The present techniques relate to managing a processing system and, more particularly, for invoking a restricted access operating system process through a RESTful interface.

Many installations today are looking to accelerate their business processes to allow immediate access to important applications and are looking to mobile applications as a key to achieving such assets. Mobile access improves the time it takes an information system professional (e.g., a system administrator, a system programmer, etc.) to obtain important information and make key decisions to maintain system availability. Often this can involve building a mobile application that invokes native operating system function in a native restricted execution state, available only using a programming interface that is not accessible to the web application that operates on behalf of a mobile application request.

SUMMARY

According to examples of the present disclosure, techniques including methods, systems, and/or computer program products for invoking a restricted access service through a representational state transfer (RESTful) interface are provided. An example method may include: receiving, at a web server, a RESTful application program interface (API) request to access a RESTful API from a user on a mobile device; determining whether the user is authorized to access the RESTful API using an authorization service; responsive to determining that the user is authorized to access the RESTful API, routing the RESTful API request from the web server to the restricted access service to process the request; and receiving, by the web server, return data from the restricted access service after processing the request.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

In the present application, a "bridge" environment is created to invoke a restricted-access operating system programming interface, to invoke an operating system function that assesses the processing system for serious error symptoms and reports them back to the user of a mobile application. One aspect of the present disclosure is the invocation of a restricted-access operating system (OS) interface (API) from a cloud or mobile application, by transitioning from a web server to an OS infrastructure that supports switching from a non-restricted, "application" state (i.e., a problem program state) to a restricted state (i.e., "supervisor state"). The restricted interface can then be invoked on behalf of the application, and binary/text response data is sent back to the "application state" for further interpretation in the data transformer, which converts the response to a defined JSON style, and returns that response to the mobile application for further interpretation into a graphical display. In doing so, the present disclosure leverages a set of existing functions of z/OS® from IBM®, like Websphere z/OS® Connect, Resource Access Control Facility (RACF), WebSphere Optimized Local Adapters (WOLA) and the OS's ability to schedule a "process" that has been configured to support execution in the restricted (supervisor) state.

Various implementations are described below by referring to several examples an infrastructure that provides an information system professional (e.g., a system administrator, a system programmer, etc.) mobile access to z/OS® system by IBM® services required to do their jobs. Doing so enables installations to expose custom services and participate in an application program interface (API) economy to increase the value of their System z platform assets. In particular, the present disclosure describes the design of a mobile application to invoke restricted access services, such as z/OS® runtime diagnostics.

Restricted access refers to an operating system (OS) kernel instruction execution mode, such as z/OS supervisor state, where programs operating in that mode may take advantage of features only allowed of operating system code. Most z/OS programmable services (APIs) require that their callers be in supervisor state. If an application program, which operates in "problem program" state, invokes a service that expects to be invoked in supervisor state, it is immediately terminated with an "abnormal termination" to avoid misuse of supervisor-state services. In z/OS, this is referred to as an abnormal end or ABEND. In the present disclosure, restricted access refers to the type of execution requirements, similar to supervisor state or any other OS kernel execution environment. This disclosure provides techniques to enable a web server, which executes in a non-restricted state (not part of the OS kernel) to transition to a restricted state, or z/OS supervisor state, so that the runtime diagnostics service can execute properly.

The runtime diagnostics of z/OS® is a function that can be invoked with an operator command when the system is experiencing degradation or to check for potential problems. It examines the system as an experienced system operator would when a problem is occurring. Doing so saves significant time required to evaluate the system, determine what the next set of actions may be, and to identify to whom to assign the problem. A mobile application to invoke this system diagnostic function can be used by the information system professional remotely to check on system health or the information system professional may simply need to respond about a potential system problem from a mobile device (such as when not near a computer).

The present disclosure provides a mobile application to invoke z/OS® runtime diagnostics via a restricted access programming interface for use by an information system professional. Goals of the present technique include ensuring the identity of the information system professional through the use of RACF® or another suitable security product, invoking the runtime diagnostics function utilizing an authorized interface to call the operating system function, obtaining a result, and preparing a more modern response with relevant information in a mobile response. An additional part of the goal is to deliver the resulting diagnostic information in a more visually appealing, usable fashion on a mobile device than existing approaches (e.g., a block of text). This enables the information system professional to recognize and act upon potential system problems quickly.

Example embodiments of the disclosure include or yield various technical features, technical effects, and/or improvements to technology. Example embodiments of the disclosure provide a RESTful interface to enable a remote information system professional to perform system diagnostics on a system, such as a z/Architecture system from IBM®. These aspects of the disclosure constitute technical features that yield the technical effect identifying and solving system problems efficiently and effectively. As a result of these technical features and technical effects, invoking a restricted access service through a RESTful interface in accordance with example embodiments of the disclosure represents an improvement to existing techniques that information system professionals use to access and solve system problems. It should be appreciated that the above examples of technical features, technical effects, and improvements to the technology of example embodiments of the disclosure are merely illustrative and not exhaustive.

Figure 1:
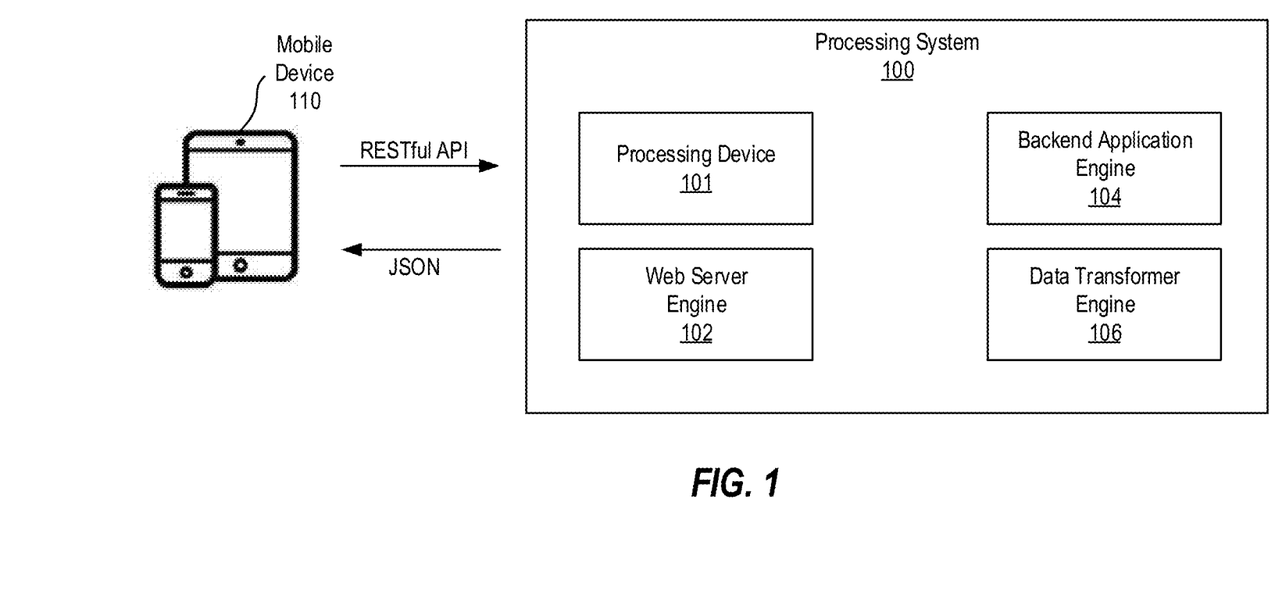
FIG. 1 illustrates a block diagram of a processing system for invoking a restricted access service through a RESTful interface according to examples of the present disclosure.

FIG. 1 illustrates a block diagram of a processing system 100 for invoking a restricted access service through a RESTful interface according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device 101 for executing those instructions. Thus a system memory can store program instructions that when executed by processing device 101 implement the engines described herein. Other engines may also be utilized to include other features and functionality described in other examples herein.

For a mobile application to interact with back end services on the processing system 100, a representational state transfer (RESTful) application program interface (API) may be used. A RESTful API is an API that uses HTTP requests to GET, PUT, POST, and DELETE data. Representational state transfer (REST), which is used by browsers, is a programming style for a client/server interface, similar to an HTTP request, with JavaScript object notation (JSON) output. In order to support invocation of z/OS® runtime diagnostics from a mobile device, a RESTful API is needed to invoke the internal z/OS® runtime diagnostic function. To do so, several requirements need to be satisfied: a target server to host the RESTful API function; the ability to securely invoke an internal restricted z/OS® function; the ability; the ability to transform the output of an internal restricted z/OS® function to a form that can be consumed by the RESTful API; and security for the RESTful API that is seamlessly integrated into the z/OS® security model.

Processing system 100 may include a processing device 101, a web server engine 102, a backend application engine 104, and a data transformer engine 106. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The web server engine 102 hosts RESTful APIs that are used to invoke the z/OS® restricted access services. In particular, the web server engine 102 provides the following functionality: defining and hosting the RESTful APIs; providing a set of APIs that can be used by back end applications to register to receive and process requests from applications using the RESTful APIs; providing a security mechanism to authenticate and authorize callers to the hosted RESTful APIs; providing an infrastructure to associate a data transformer to a RESTful API so that any return data can be transformed to the proper JSON format with the correct character encoding (e.g., a complex extended binary coded decimal interchange code (EBCDIC) encoded output).

In one example, the web server engine 102 may be the IBM® Web Sphere Liberty Profile (WLP) product with z/OS Connect. The WLP product provides a set of APIs (e.g., WebSphere optimized local adapters (WOLA)) that enable a back end application to register to service specific RESTful APIs.

In some examples using WOLA according to aspects of the present disclosure, the web server engine 102 performs the following steps using a WOLA client: registering with WOLA; getting a data area (e.g., key 8); switching to a restricted state; invoking a runtime diagnostics; switching to a problem state; passing output buffer (e.g., key 8) back to the web server engine 102. The WOLA client, in restricted state, may perform the following runtime diagnostics: CPU usage, loop detection, enqueue contention, latch contention, file system latch contention, server health, message analysis, job entry subsystem (JES2) health exceptions, examining the system for anomalies related to CPU usage, etc.

The backend application engine 104 provides an operation system deployment process with the configured ability to switch to the operating system's restricted execution state and back to the original, non-restricted execution state. According to aspects of the present disclosure, a z/OS® specific implementation deploys the operating system with a "started task" or address space and uses a Link-edit statement to indicate that the program is permitted to switch between the restricted state and the non-restricted execution state. In an example, the backend application engine 104 provides the following functionality: running as a z/OS® batch application or started task; invoking the supervisor state z/OS® service for runtime diagnostics; invoking the web server APIs that enable the application to register to accept the RESTful API requests; and processing the RESTful API requests and returning data back to the web server engine 102.

The data transformer engine 106 transforms the EBCDIC encoded output from the z/OS® restricted access service to JSON format, such as with UTF-8 encoding. In particular, the data transformer engine 106 provides the following functionality: interpreting the structure of the output buffer from a z/OS® restricted access service; transforming EBCDIC encoded characters to UTF-8 encoded characters; transforming binary data to UTF-8 encoded data, and creating JSON format data from the transformed data. In examples, the data transformer engine 106 is invoked by the WOLA upon receipt of a diagnostic data buffer, as indicated by a WOLA configuration parameter.

As illustrated in FIG. 1, a mobile device 110, such as a smart phone, tablet computer, laptop computer, personal digital assistant, or other similar computing device, may be utilized by a user to access the processing system 100. In an example, the requests are transferred to the processing system via a RESTful API and results are returned in JSON.

Figure 2:
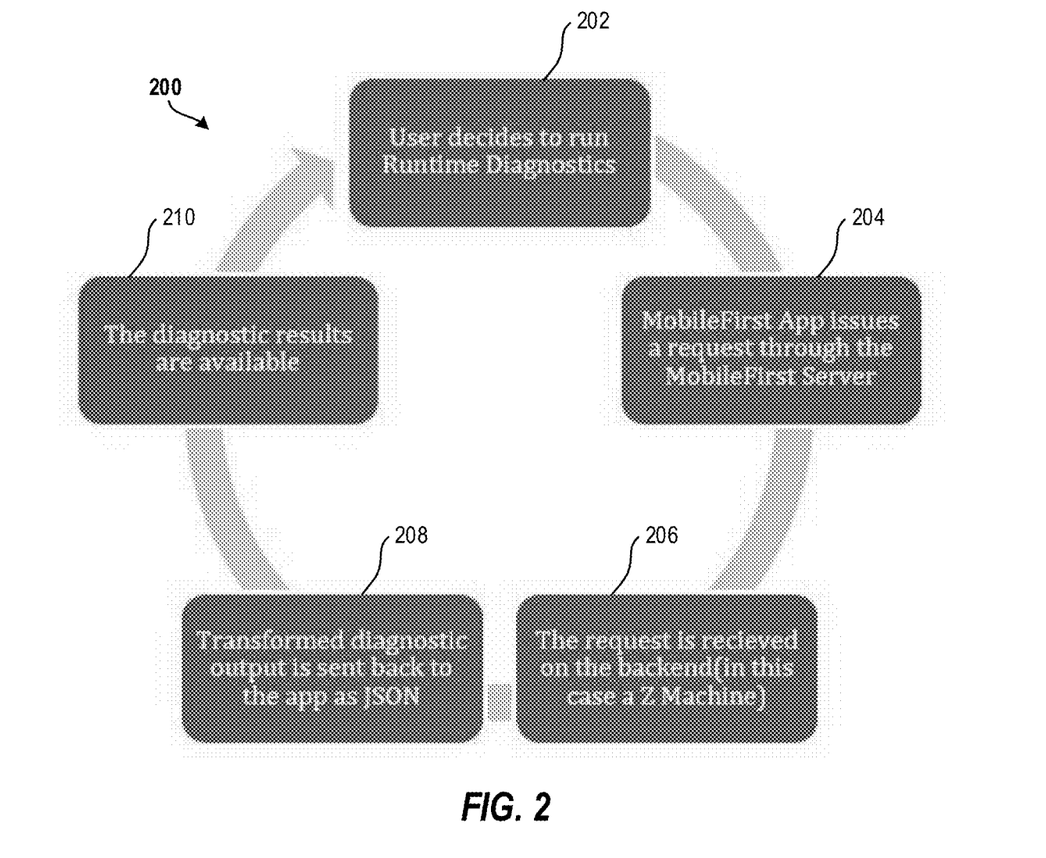
FIG. 2 illustrates a flow diagram of a method of a mobile application receiving diagnostic results from a RESTful API request as a JSON response according to aspects of the present disclosure.

FIG. 2 illustrates a flow diagram of a method 200 of a mobile application receiving diagnostic results from a RESTful API request as a JSON response according to aspects of the present disclosure. The method 200 may be performed, for example, by a processing system such as the processing system 100 of FIG. 1, by the processing system 20 of FIG. 4, or by another suitable processing system.

At block 202, the method 200 includes beginning the runtime diagnostic process from a user's mobile application (e.g., the mobile device of FIG. 2). At block 204, the method 200 includes issuing a request through a web server (e.g., the web server engine 102 of FIG. 1). At block 206, the request is received on a backend application (e.g., the backend application engine 104 of FIG. 1), which may be executing on a backend computer such as an IBM® z System computer. At block 208, the method 200 includes transforming diagnostic data, such as by a data transformer (e.g., the data transformer 106 of FIG. 1), sent from the backend application back to the user's mobile device. At block 210, the diagnostic results are made available to the user on the user's mobile device. The diagnostic results may be OS diagnostic information in the form of detected component errors and other diagnostic symptom data.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
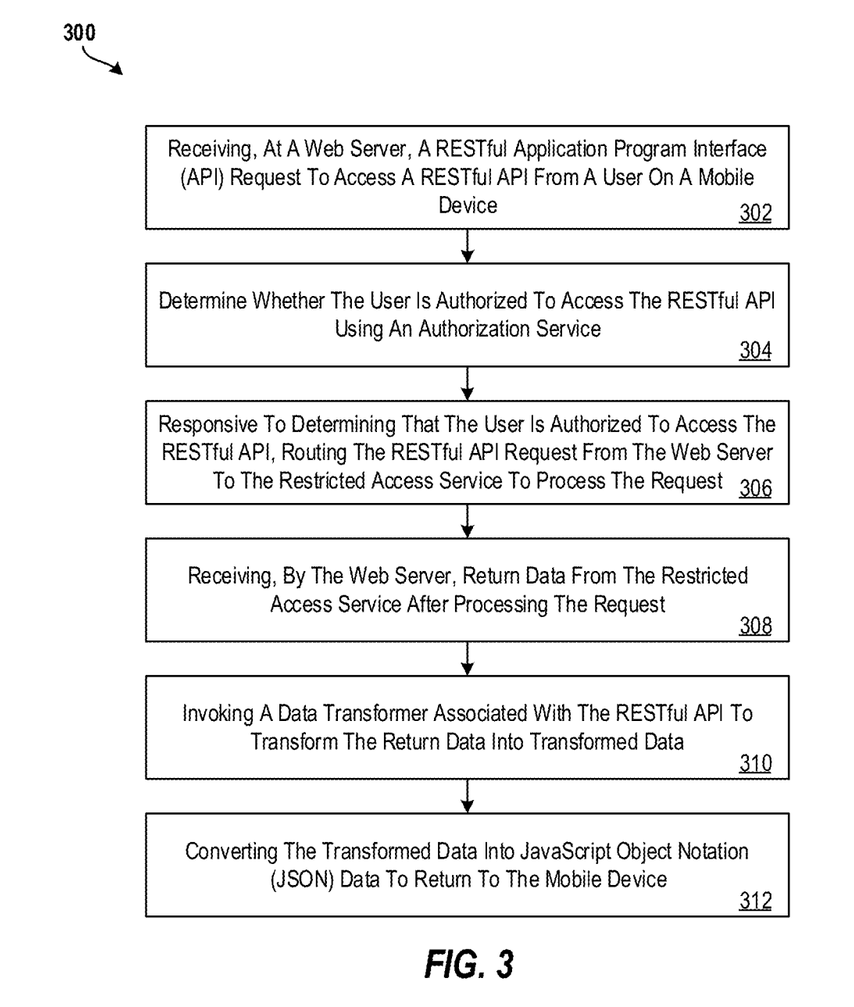
FIG. 3 illustrates a flow diagram of a method for invoking a restricted access service through a RESTful interface according to aspects of the present disclosure.

FIG. 3 illustrates a flow diagram of a method 300 for invoking a restricted access service through a RESTful interface according to aspects of the present disclosure. The method 300 may be performed, for example, by a processing system such as the processing system 100 of FIG. 1, by the processing system 20 of FIG. 4, or by another suitable processing system.

According to aspects of the present disclosure, at least one of the following preconditions may be met: web server (e.g., the web server engine 102 of FIG. 1) is configured to host the RESTful API; the security infrastructure is configured such that authorized users and the users' associated passwords are stored into a security product (e.g., the resource access control facility (RACF) product by IBM®) that is used to prohibit and permit users' access to the RESTful API on the web server; a data transformer (e.g., the data transformer engine 106 of FIG. 1) that transforms the output returned from the z/OS restricted access service is written and is configured to be associated with the RESTful API; a backend z/OS® application (e.g., the backend application engine 104) that calls the restricted access service is started as a batch job or a started task.

At block 302, the method includes receiving, at a web server, a RESTful application program interface (API) request to access a RESTful API from a user on a mobile device.

At block 304, the method includes determining whether the user is authorized to access the RESTful API using an authorization service. Verifying that the user is authorized to call the RESTful API may include verifying a user credential received with the call to the RESTful API against a known user credential database. For example, the authorization service may compare a received user credential against known user credentials to determine a match. The user credential may be a username and an associated password, an authentication token, or another suitable authentication credential.

If it is determined that the user is not authorized to call the RESTful API, an error message is returned to the mobile device.

If, however, it is determined that the user is authorized to call the RESTful API, at block 306 the method 300 includes routing the RESTful API request from the web server to an application to process the request. In examples, the application allocates an output buffer that is used to store data returned from the authorization service. The application may proceed to process the request and transition to a restricted state from a problem program state.

The application may also invoke a restricted access service that returns data in an output buffer, wherein the data is indicative of a runtime status of a processing system and then change back to the problem state from the restricted state. In examples, the application uses a web server API to return the data back to the web server. The application may wait for subsequent RESTful API requests to process. In particular, a restricted-state operating system process (e.g., a z/OS® started task address space) is scheduled, and then the WOLA "posts" the operating system process to switch to the restricted execution state. The restricted programming interface is then invoked and the output response containing diagnostic information in handled. The application then returns to the non-restricted execution state (also known as an "application state") using, for example, a z/OS® key 8 problem program environment consistent with WebSphere.

At block 308, the method includes receiving, by the web server, return data from the application after processing the request.

At block 310, the method includes invoking a data transformer associated with the RESTful API to transform the returned data into a format that can be processed. In an example, the data transformer transforms the return data from a binary format into a UTF-8 format. In another example, the data transformer transforms the return data from at extended binary coded decimal interchange code format into a UTF-8 format.

At block 312, the method includes converting the transformed data into JavaScript object notation (JSON) data to return to the mobile device.

Additional processes also may be included. For example, the method 300 may further include returning the JSON data to the mobile device. It should be understood that the processes depicted in FIG. 3 represent illustrations, and that other processes may be added or existing processes may be removed, modified, or rearranged without departing from the scope and spirit of the present disclosure.

Figure 4:
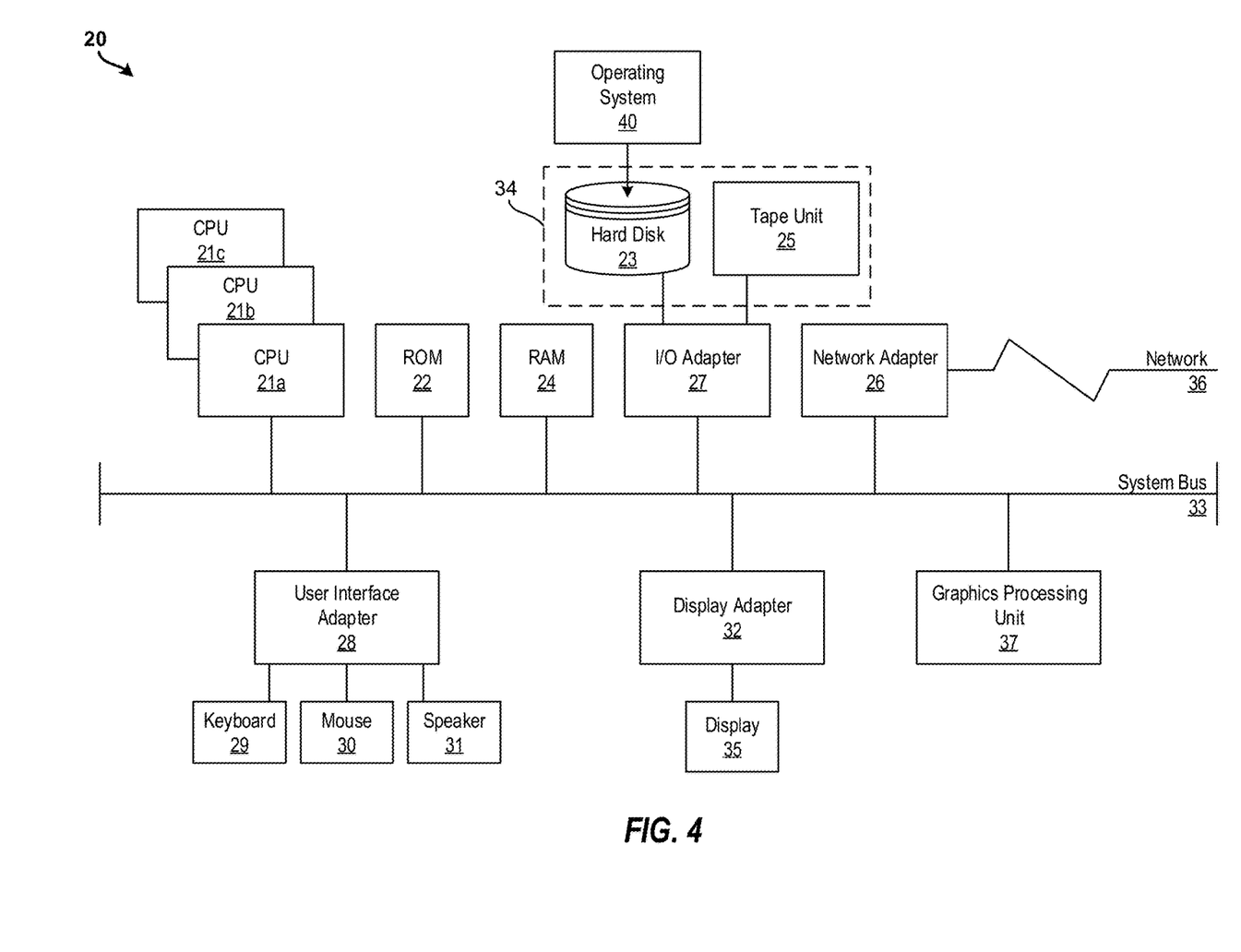
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
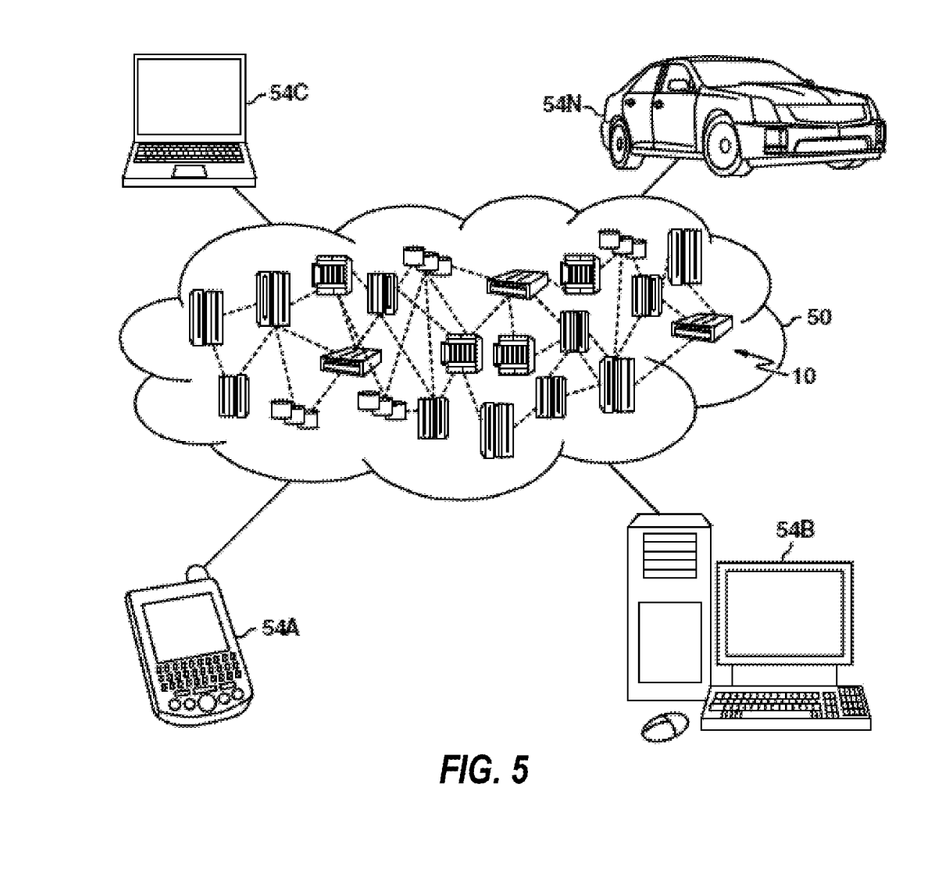
FIG. 5 illustrates a cloud computing environment according to examples of the present disclosure.

Referring now to FIG. 5, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
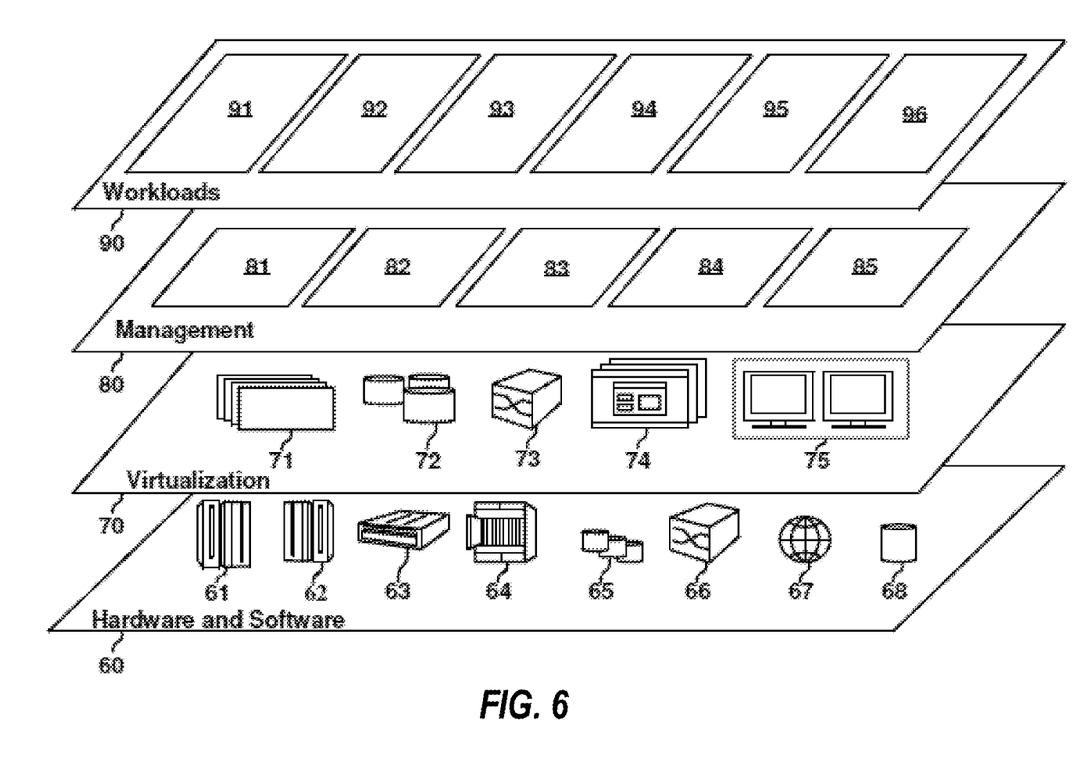
FIG. 6 illustrates abstraction model layers according to examples of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and invoking authorized restricted access service through a RESTful API 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for invoking a restricted access service through a representational state transfer (RESTful) interface, the method comprising:
   receiving, at a web server, a RESTful application program interface (API) request to access a RESTful API from a user on a mobile device;
   determining whether the user is authorized to access the RESTful API using an authorization service;
   responsive to determining that the user is authorized to access the RESTful API, routing the RESTful API request from the web server to the restricted access service to process the request;
   receiving, by the web server, return data from the restricted access service after processing the request; and
   invoking a data transformer associated with the RESTful API to transform the return data into transformed data.

2. The computer-implemented method of claim 1, further comprising converting the transformed data into JavaScript object notation (JSON) data to return to the mobile device.

3. The computer-implemented method of claim 2, further comprising returning the JSON data to the mobile device.

4. The computer-implemented method of claim 1, wherein the RESTful API allocates an output buffer that is used to store diagnostic response data returned from the restricted access service.

5. The computer-implemented method of claim 1, wherein the RESTful API receives the request.

6. The computer-implemented method of claim 1, wherein the RESTful API changes to a restricted state from a non-restricted state.

7. The computer-implemented method of claim 1, wherein the RESTful API invokes the restricted access service that returns diagnostic response data in an output buffer, wherein the diagnostic response data is indicative of a runtime status of a processing system.

8. The computer-implemented method of claim 6, wherein the RESTful API changes back to the non-restricted state from the restricted state.

9. The computer-implemented method of claim 7, wherein the RESTful API uses a web server API to return the diagnostic response data back to the web server.

10. The computer-implemented method of claim 1, wherein the RESTful API waits for a subsequent RESTful API request.

11. The computer-implemented method of claim 1, wherein the data transformer transforms the return data from a binary format or an extended binary coded decimal interchange code format into a UTF-8 format.

12. The computer-implemented method of claim 1, wherein the data transformer transforms the return data from an extended binary coded decimal interchange code format into a UTF-8 format.

13. The computer-implemented method of claim 1, wherein verifying that the user is authorized to call the RESTful API comprises verifying a user credential received with a call to the RESTful API against a known user credential database.

14. The computer-implemented method of claim 13, wherein the user credential is a username and an associated password.

15. The computer-implemented method of claim 1, further comprising responsive to determining that the user is not authorized to call the RESTful API, returning an error message to the mobile device.

16. A system for invoking a restricted access service through a representational state transfer (RESTful) interface, the system comprising:
   a memory having computer readable instructions; and
   a processing device for executing the computer readable instructions, the computer readable instructions comprising:
      receiving, at a web server, a RESTful application program interface (API) request to access a RESTful API from a user on a mobile device;
      determining whether the user is authorized to access the RESTful API using an authorization service;
      responsive to determining that the user is authorized to access the RESTful API, routing the RESTful API request from the web server to the restricted access service to process the request;
      receiving, by the web server, return data from the restricted access service after processing the request; and
      invoking a data transformer associated with the RESTful API to transform the return data into transformed data.

17. The system of claim 16, the computer readable instructions further comprising:
   converting the transformed data into JavaScript object notation (JSON) data to return to the mobile device; and
   returning the JSON data to the mobile device.

18. The system of claim 16, wherein the RESTful API allocates an output buffer that is used to store diagnostic response data returned from the restricted access service, wherein the RESTful API receives the request, wherein the RESTful API changes to a restricted state from a non-restricted state, wherein the RESTful API invokes the restricted access service that returns the diagnostic response data in an output buffer, wherein the diagnostic response data is indicative of a runtime status of a processing system, wherein the RESTful API changes back to the non-restricted state from the restricted state, wherein the RESTful API uses a web server API to return the diagnostic response data back to the web server, and wherein the RESTful API waits for a subsequent RESTful API request.

19. The system of claim 16, wherein the data transformer transforms the return data from a binary format or an extended binary coded decimal interchange code format into a UTF-8 format.

20. A computer program product for invoking a restricted access service through a representational state transfer (RESTful) interface, the computer program product comprising:
   a computer readable storage medium having program instructions embodied therewith, wherein the computer readable storage medium is not a transitory signal per se, the program instructions executable by a processing device to cause the processing device to perform a method comprising:
      receiving, at a web server, a RESTful application program interface (API) request to access a RESTful API from a user on a mobile device;
      determining whether the user is authorized to access the RESTful API using an authorization service;
      responsive to determining that the user is authorized to access the RESTful API, routing the RESTful API request from the web server to the restricted access service to process the request;
      receiving, by the web server, return data from the restricted access service after processing the request; and
   invoking a data transformer associated with the RESTful API to transform the return data into transformed data.

* * * * *